United States Patent Office 3,347,912
Patented Oct. 17, 1967

3,347,912
NOVEL GRIGNARD REAGENTS
Charles A. Rowe, Jr., Roselle, Alan Schriesheim, Berkeley Heights, and Shelton Bank, Watchung, N.J., assignors to Esso Research and Engineering Company, a corporation of Delaware
No Drawing. Filed Apr. 17, 1963, Ser. No. 273,573
5 Claims. (Cl. 260—551)

This invention concerns novel solvents for Grignard reagents and, in a broader sense, concerns novel Grignard reagents comprising unique solvent complexes. The invention specifically concerns the use of phosphoramides with conventional Grignard reagents, providing a Grignard system having increased activity in conventional Grignard reactions, and unique activity in other reactions, which cannot be achieved with conventional Grignard reagents.

Grignard reagents have broad application for chemical syntheses. These compounds are conventionally made by the reaction of an organic halide directly with magnesium metal in a suitable solvent for both the organic halide and the organo magnesium product. It has now been found in accordance with this invention that the nature, properties and applications of Grignard reagents made in accordance with conventional techniques may be improved and extended by using phosphoramides as a solvent or complexing agent. In using the invention, the Grignard reagent is prepared in the conventional manner and thereafter is mixed with the phosphoramide. It has been found that the phosphoramide forms a definite complex or chemical compound with the conventional Grignard compound so as to result in a novel type of Grignard reagent of greater activity and unique properties. For example, the invention is of specific application in the polymerization of olefins or diolefins which cannot be polymerized with conventional Grignard compounds. Again, for example, the invention is applicable for any of the conventional Grignard synthesis enabling benefits due to the higher activity of the novel Grignard reagent of this invention.

The present invention is applicable to the preparation of Grignard reagents according to any of the conventional techniques. Most commonly, these reagents are prepared by the reaction of hydrocarbon halides with magnesium metal in suitable liquid solvents for Grignard reagents. The organic halides which may be used in the preparation of these reagents broadly comprise any organic halide consisting of carbon, hydrogen and halogen, including the alkyl, aryl and arylalkyl chlorides, bromides and iodides. Preferably the organic halides contains from 1 to 10 carbon atoms and preferred examples of suitable organic halides include ethyl bromide, iodide or chloride; propyl iodide, chloride or bromide; and butyl iodide, chloride or bromide. Other examples of suitable organic halides include bromobenzene, chlorobenzene, xylyl chloride, and so on.

The metallic magnesium employed in the preparation of Grignard reagents is ordinarily used in a finely divided form. Magnesium shavings, chips, powder or ribbon may preferably be employed so as to promote reaction with the organic halide as a result of the large surface area of magnesium which is presented.

Suitable liquid solvents for Grignard reactions particularly include ether or ether-like solvents, including the dialkyl ethers, the glycol ethers, tertiary amines, heterocyclic amines and selected hydrocarbons having suitable solvency. However, the preferred conventional solvent for preparation of Grignard reagents comprises the lower dialkyl ethers and particularly diethyl ether.

The Grignard reagent is ordinarily prepared by admixing the solvent and magnesium and thereafter adding the organic halide in small portions so as to control the rapid reaction which occurs. About 25 to 30 volume percent of organic halide is ordinarily used based on the amount of organic solvent employed, and about 100 to 110 mol percent of magnesium is ordinarily reacted based on the amount of organic halide.

In accordance with this invention, Grignard reagents prepared by the conventional procedures referred to are then mixed with about 1 to 100 mols of phosphoramide per mol of Grignard reagent. The preferred range is about 2 to 10 mols of the phosphoramide. The phosphoramide used is broadly a compound having the following generic formula:

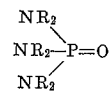

where R equals a $C_1$ to $C_{10}$ alkyl or aryl radical. However, it is preferred to use the lower alkyl radicals, and the preferred phosphoramide for use in this invention is hexamethyl phosphoramide.

Addition of the phosphoramide compound to the conventional Grignard reagent apparently results in the formation of a definite chemical complex or chemical compound. Thus, it is possible to remove excess ether from the reaction product and to segregate a complex or compound of alkyl magnesium halide, ether and phosphoramide which is stable and hydrocarbon soluble. Both ether and phosphoramide are in some manner coordinated with the alkyl magnesium halide. The precise nature of this complex or new chemical compound has not yet been identified although evidence has been obtained that the active catalytic material has the empirical formula $R_3Mg_2X$ in combination with ether and phosphoramide. Use of excess amounts of phosphoramide can result in the precipitation of an adduct consisting of $MgX_2$ and phosphoramide. This adduct has been found to be catalytically inactive although its presence does not affect the catalytic activity of the soluble species referred to which is maintained in solution in the ether-phosphoramide media.

It is a particular feature of this invention that the phosphoramide modification of conventional Grignard reagents results in a hydrocarbon soluble Grignard catalyst which is stable at elevated temperatures. Thus, use of the conventional Grignard reagents has been restricted to relatively low temperatures at which the organic ether solvents distill. On the other hand, the Grignard reagent of this invention is stable and may be used at temperatures ranging upwardly to about 150° C. when used under an inert atmosphere so as to avoid oxidation.

It has been found that the R MgX-ether-phosphoramide reagent permits the following reversible reaction to be shifted toward the right:

It is possible that the formation of $R_2Mg$ is responsible for the unique properties of the Grignard reagents of this invention although the invention is not restricted to this particular theory. Thus, it has been found when working with pure compounds that magnesium dihalide ($MgX_2$) is inactive in phosphoramide solvent. On the other hand, dialkyl magnesium ($R_2Mg$) when used in phosphoramide solvent is an effective reagent and can, for example, cause the polymerization of olefins or diolefins. It is within the scope of this invention, therefore, to employ $R_2Mg$ where R equals an alkyl, aryl or alkaryl group as identified hereinbefore in a phosphoramide solvent as an alternate to preparation of the conventional Grignard reagent.

The invention can further be extended to the use of other Group IIA or IIB metal alkyls as alternates for the dialkyl magnesium. Suitable metals include beryllium, magnesium, calcium, cadmium and zinc.

The novel Grignard reagent system of this invention can also be modified by use with transition metal halides and particularly cuprous chloride or cobalt chloride. The transition metal halides have the property of effecting polymerization of simple diolefins so as to cause the production of cis-1,4 polymer structure.

The novel Grignard reagent system described may be employed in any of the conventional syntheses in which Grignard reagents are used. Thus, for example, these reagents may be used in the following conventional Grignard reactions:

Reaction with aldehydes, ketones and ketenes;
Reaction with esters and lactones;
Reaction with carbonyl halides;
Reaction with nitriles and other cyano compounds;
Reaction with carboxylic amides, imides and lactams;
Reaction with oxides of carbon and with carboxylic acids and their salts;
Reaction with epoxides;
Reaction with ethers, acetals and ketals;
Reaction with alkyl, aralkyl and cyclo alkyl halides;
Reaction with oxides of nitrogen and sulfur;
Reaction with non-metallic derivatives: halides, oxy halides and esters of silicon, boron and phosphorus.

It is a particular feature of this invention that the novel Grignard reagents may be used as catalysts to cause the polymerization of monoolefins or diolefins. The monoolefins which may be polymerized include styrene, alkyl styrenes, vinyl ethers and esters, and vinyl halides, in which the olefin bond is activated by an electron withdrawing group. Thus, simple monoolefins cannot be polymerized. Diolefins which may be polymerized include any conjugated diolefin having up to 10 carbon atoms, particularly including butadiene, isoprene, piperylene, 1,3-cyclohexadienes, and divinyl benzene.

The nature and advantages of this invention will be better understood by reference to the following examples.

*Example 1*

This example shows the use of the Grignard reagents of this invention to polymerize butadiene.

Phenyl magnesium bromide was prepared in 350 ml. of diethyl ether from 20 grams (0.82 g. atom) of magnesium and 78.5 grams (0.50 mol) of bromobenzene using conventional procedures. The resulting solution was filtered in an inert atmosphere to remove excess magnesium. The phenyl magnesium bromide ether solution (20 cc., 0.054 mol) was mixed with 100 cc. (0.56 mol) of hexamethyl phosphoramide under nitrogen at 25°. This composition was then added to an autoclave under an inert atmosphere of nitrogen. Butadiene (33 volume percent, 1.0 mol) was then introduced to the autoclave under an inert atmosphere of nitrogen sufficient to liquefy the butadiene (200–500 p.s.i.). The reaction mixture was stirred for 19 hours at 25° C. At the end of this time the pressure was released through a Dry-Ice trap to collect unreacted butadiene. No butadiene was obtained in the cold trap or in the collected effluent gases as determined by mass spectrographic analysis. The highly viscous material remaining in the autoclave was added to methanol and acidified. There was no liberation of dissolved butadiene. A cream-colored polymeric material immediately settled from the solution. This material was separated from the methanol solution by decantation and was purified by dissolution in cyclohexane and reprecipitation with methanol. A white heavy polymer (51.2 g.) material was obtained after drying. This corresponds to a 95% conversion of butadiene to polymer. The analysis of this polymer showed that it was composed of 80% 1,2; 0.5% cis 1,4 and 19.5 trans-1,4 polymer types.

*Example 2*

For comparison with Example 1, a similar experiment was conducted using benzene in place of hexamethyl phosphoramide. In this case, it was not possible to polymerize the butadiene. The phenyl magnesium bromide prepared in accordance with the preceding example was mixed with benzene under nitrogen at 25° C. 0.054 mol of the phenyl magnesium bromide in 20 cc. of ether solution were used with 100 cc. of benzene. This composition was added to the autoclave under an inert atmosphere of nitrogen and reacted with a 20-fold excess of butadiene based on the amount of organomagnesium as in the preceding example. At the end of the reaction time, 20% of unreacted butadiene was recovered in the cold trap. Copious quantities of dissolved butadiene were also evolved upon addition of methanol and acidification of the remaining liquid. No polymer separated and the organic phase was separated and analyzed by gas chromatography and infra-red spectroscopy. There was no polymeric material and the organic phase was established to be essentially pure benzene.

*Example 3*

Butadiene was polymerized using the reagents of this invention as in Example 1, but conducting the polymerization at atmospheric pressure as compared to the liquid phase polymerization of Example 1.

In a glass apparatus provided with an efficient low temperature ($-50°$ C.) condenser, 3.0 cc. (.008 mol) of phenyl magnesium bromide in ether were mixed with 10.0 cc. of hexamethyl phosphoramide. To this mixture were added 10.0 cc. liquefied butadiene and the reaction mixture was stirred for 14 hours at room temperature and atmospheric pressure. After work-up in the usual way, there was obtained 5.0 g. (a 56% conversion) polybutadiene similar to that obtained in Example 1.

The same procedure using toluene in place of hexamethyl phosphoramide led to the recovery of starting materials and no polymer product.

*Example 4*

This example shows the polymerization of isoprene in accordance with this invention, using the procedure of Example 1.

From 0.054 mols of phenyl magnesium bromide in 20 cc. of diethyl ether, 100 cc. (0.56 mol) of hexamethyl phosphoramide and 60 cc. (0.60 mol) of isoprene, there was obtained a 95% conversion of isoprene to polymer. This reaction was conducted at room temperature and atmospheric pressure for 19 hours. Analysis of this polymer showed that it comprised 47% 3,4 and 53% 1,2 types of unsaturation.

*Example 5*

The procedure of Example 1 was used to polymerize piperylene. From 0.052 mol of phenyl magnesium bromide in 20 cc. of diethyl ether, 100 cc. (0.56 mol) of hexamethyl phosphoramide and 60 cc. (0.60 mol) of piperylene, there was obtained a 95% conversion to an oily polymer.

*Example 6* n-Butyl magnesium bromide prepared in ether by conventional techniques mixed with hexamethyl phosphoramide was reacted with butadiene as described in Example 1. From 0.052 mol of n-butyl magnesium bromide in 20 cc. of ether, 100 cc. (0.56 mol) of hexamethyl phosphoramide and 60 cc. (1.0 mol) of butadiene, there was obtained a 50% yield of polybutadiene. The properties of this material are essentially identical with the polymer obtained in Example 1.

*Example 7*

Using the procedure of Example 1, sec-butyl magnesium bromide was used as the Grignard component to polymerize butadiene. From 0.052 mol of sec-butyl magnesium bromide in 20 cc. of ether, 100 cc. (0.56 mol) of hexamethyl phosphoramide and 60 cc. (1.0 mol) of butadiene, a 35% conversion to polybutadiene was obtained.

Example 8

The polymerization of butadiene by the system vinyl magnesium chloride in tetrahydrofuran and hexamethyl phosphoramide was conducted using the procedure of Example 1. The vinyl magnesium chloride had been prepared by conventional techniques in tetrahydrofuran. From 0.050 mol of vinyl magnesium chloride in 20 cc. of tetrahydrofuran, 100 cc. (0.56 mol) of hexamethyl phosphoramide and 60 cc. (1.0 mol) of butadiene, a 100% conversion to polybutadiene was obtained.

Example 9

In a small three-necked glass apparatus under an inert atmosphere, styrene was polymerized by n-butyl magnesium bromide and hexamethyl phosphoramide. From 0.02 mol of butyl magnesium bromide in 10 cc. of ether, 40 cc. (.25 mol) of hexamethyl phosphoramide and 1.0 g. (0.010 mol) of styrene, there was obtained a 90% conversion (of) a typical anionic polystyrene.

When the same procedure was repeated using diglyme in place of hexamethyl phosphoramide, no anionic polymer was formed.

Example 10

The procedure of Example 9 was used to polymerize alpha methyl styrene. From 0.02 mol of butyl magnesium bromide in 10.0 cc. of ether, 40 cc. (0.25 mol) of hexamethyl phosphoramide and 1.2 g. (0.010 mol) of alpha methyl styrene, a 30% conversion to polymer was realized.

Example 11

Using an ether solution of phenyl magnesium bromide prepared as in Example 1 and hexamethyl phosphoramide, the addition reaction with benzophenone was performed. In a conventional Grignard synthesis glass reaction system under nitrogen, 60 cc. of a 1.67 M. phenyl magnesium ether solution (0.10 mol) were mixed with 30 cc. (0.16 mol) of hexamethyl phosphoramide at 25° C. A solution of 9.1 g. (0.05 mol) of benzophenone in 40 cc. (0.22 mol) of hexamethyl phosphoramide was added over a period of 30 minutes. After one hour at room temperature and one hour at 50° C., the reaction mixture was hydrolyzed. After work-up in the conventional manner, there was obtained an 80% yield of triphenyl carbinol (analyzed by gas chromatography and infra-red spectroscopy). A duplicate experiment using diethyl ether in place of hexamethyl phosphoramide gave a 78% yield of triphenyl carbinol.

Example 12

In a conventional glass apparatus under nitrogen, 100 cc. (0.56 mol) of hexamethyl phosphoramide were mixed with 0.050 mol of phenyl magnesium bromide in 20 cc. of diethyl ether. The resulting mixture was injected from a hypodermic syringe into a beaker containing 100 g. (2.26 mols) of powdered carbon dioxide. The reaction mixture was warmed to room temperature and was worked up in the usual way. They were obtained 5.5 g. (a 90% yield) of benzoic acid. A parallel experiment using ether in place of hexamethyl phosphoramide gave a comparable yield (91%).

Example 13

Diphenyl-magnesium (4.45 g., 0.025 mol) was dissolved in 100 cc. (0.56 mol) of hexamethyl phosphoramide in an inert (nitrogen) atmosphere. The resulting solution was transferred under a nitrogen blanket to an autoclave. Butadiene (78 cc., 1.3 mol) was introduced at a nitrogen pressure sufficient to liquefy the gas (200 p.s.i.g.). The reaction mixture was stirred for 14 hours at room temperature and 175 p.s.i.g. The effluent gases were passed through an efficient cold trap. No liquid butadiene was recovered. The material in the autoclave was worked up as in Example 1 to give 68.1 g. (95% conversion) of polybutadiene. In conventional solvents (diethyl ether, tetrahydrofuran), 5% conversion was obtained, essentially similar to the material obtained in Example 1. This example, therefore, shows the unique activity of $R_2Mg$ in hexamethyl phosphoramide.

Example 14

The procedure of Enample 13 was used to determine the catalytic activity toward butadiene of magnesium bromide in hexamethyl phosphoramide. From 1.70 g. (0.0092 mol) of anhydrous magnesium bromide in 100 cc. (0.56 mol) of hexamethyl phosphoramide and 60 cc. (1.0 mol) of butadiene, 87% of the unchanged butadiene was recovered in the trap. The remaining dissolved gas was liberated during the work-up procedure. There was no polymeric material obtained.

What is claimed is:

1. In a process for preparing a Grignard reagent wherein magnesium and a hydrocarbon halide, the hydrocarbon being selected from the group consisting of $C_1$–$C_{10}$ alkyl, aryl, and an arylalkyl radical, are first reacted in a liquid solvent for a Grignard reaction selected from the group consisting of an ether, a tertiary amine, and a heterocyclic amine, whereby a Grignard reagent is formed, the improvement which comprises a second liquid phase reaction of the Grignard reagent in an inert atmosphere and with about 1–100 mol percent, based on the Grignard reagent, of a phosphoramide having the formula $$(NR_2)_3P=O$$

wherein R is a methyl radical.

2. The process defined by claim 1 wherein the phosphoramide is hexamethyl phosphoramide.

3. The process defined by claim 1 wherein the liquid solvent is an ether.

4. An improved Grignard reagent comprising the liquid phase reaction product in an inert atmosphere of (A) a Grignard reagent, formed by the reaction of magnesium and a hydrocarbon halide, the hydrocarbon being selected from the group consisting of $C_1$–$C_{10}$ alkyl, aryl, and an arylalkyl radical, in a liquid solvent for a Grignard reaction selected from the group consisting of an ether, a tertiary amine, and a heterocyclic amine, with (B) about 1–100 mol percent, based on the Grignard reagent, of a phosphoramide having the formula 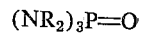 wherein R is a methyl radical.

5. The improved Grignard reagent defined by claim 4 wherein the liquid solvent for Grignard reactions is an ether.

References Cited

Fraenkel et al., J. Am. Chem. Soc., volume 87, pages 1406 to 1407 (1965).

WALTER A. MODANCE, *Primary Examiner.*

H. I. MOATZ, *Assistant Examiner.*